(12) United States Patent
Charbonneau

(10) Patent No.: US 8,664,526 B2
(45) Date of Patent: Mar. 4, 2014

(54) SHALLOW ELECTRIC BOX

(76) Inventor: Pierre Charbonneau, St-Sauveur (CA)

( * ) Notice: Subject to any disclaimer, the term of this patent is extended or adjusted under 35 U.S.C. 154(b) by 56 days.

(21) Appl. No.: 13/567,016

(22) Filed: Aug. 4, 2012

(65) Prior Publication Data
US 2013/0032372 A1 Feb. 7, 2013

(30) Foreign Application Priority Data

Aug. 4, 2011 (GB) .................................. 1113487.1

(51) Int. Cl.
H01R 13/46 (2006.01)
(52) U.S. Cl.
USPC ............... 174/59; 174/50; 220/4.02; 248/906
(58) Field of Classification Search
USPC ................... 174/50, 59; 439/535; 248/906; 220/4.02; 361/600
See application file for complete search history.

(56) References Cited

U.S. PATENT DOCUMENTS

| 2,248,759 A | 7/1941 | Hollander |
| 2,433,917 A | 1/1948 | McCartney |
| 3,716,651 A | 2/1973 | Werner |
| 3,858,161 A | 12/1974 | Champion et al. |
| 4,295,018 A | 10/1981 | Borrelli |
| 5,500,487 A | 3/1996 | Leon |
| 6,642,447 B1 | 11/2003 | Mailloux |
| 7,915,528 B2 * | 3/2011 | Ni .................................. 174/53 |
| 8,497,424 B2 * | 7/2013 | Castaldo ......................... 174/50 |

\* cited by examiner

Primary Examiner — Dhirubhai R Patel

(57) ABSTRACT

A shallow electric box has a back wall, and top, bottom, and opposite side walls perpendicularly connected to said back wall to thereby form a box shape. A wire connector connected to an interior surface of each of the side wall, and at least two tab members that are adapted to be mechanically connected to an electrical unit to be inserted within the electric box, and are adapted to frictionally engage respective the wire connectors on respective interior surfaces of each respective of the side wall, to thereby provide a quick and easy means for electrically inserting and removing the electrical unit from the electric box.

15 Claims, 6 Drawing Sheets

SECTION E-E

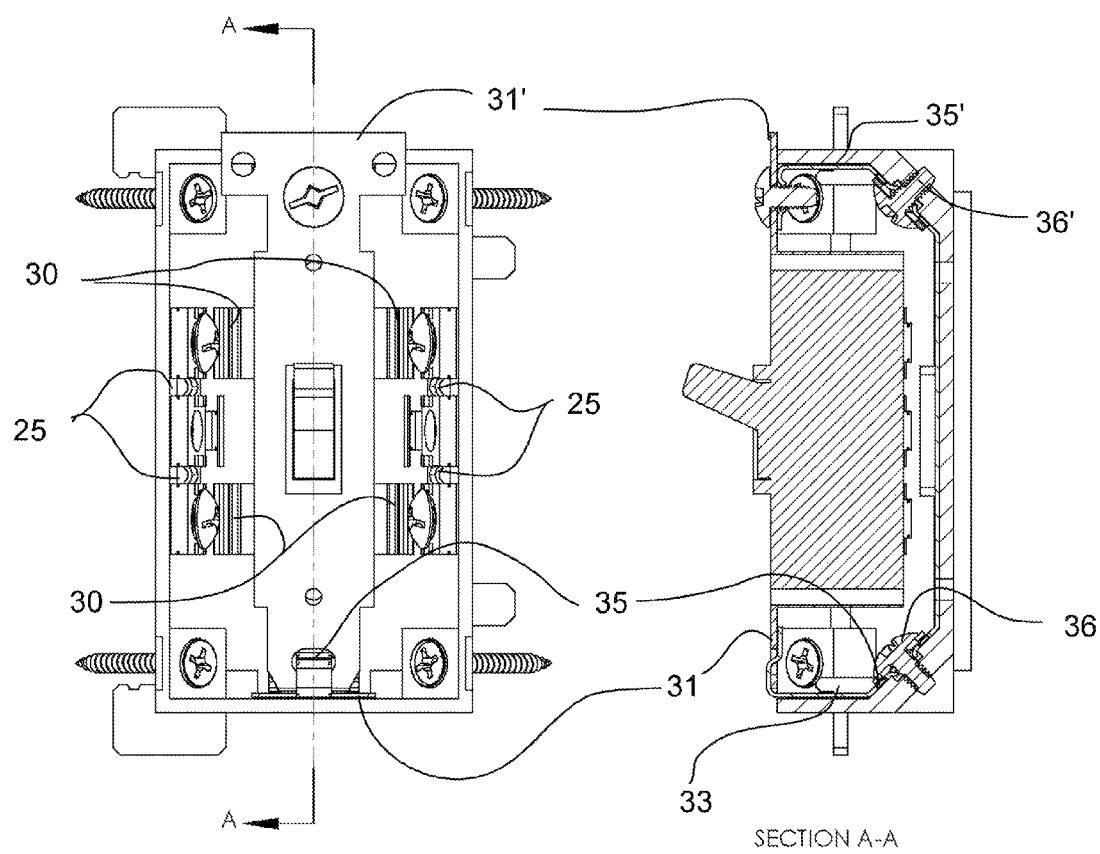

SECTION B-B

SHALLOW ELECTRIC BOX

This application claims priority based on request GB1113487.5 filed Aug. 4, 2011

FIELD OF THE INVENTION

The present invention relates generally to electrical equipment but more particularly to a shallow electrical outlet or switch box.

BACKGROUND OF THE INVENTION

There are many types of electric boxes, most are made out of metal but some are made out of plastic. In some instances, some of those boxes are shallow. However, because of the way they are constructed, when comes time to install hem or run wires into them, there is the need to cut holes through the polyethylene vapor barrier, which has an impact on its properties. Also, the wires that come inside the box are often connected to the outlet or switch in a complicated manner and then pushed inside the box so that everything can be fitted inside the box.

SUMMARY OF THE INVENTION

In view of the foregoing disadvantages inherent in the known devices now present in the prior art, the present invention, which will be described subsequently in greater detail, is to provide objects and advantages which are:

To provide for a shallow electric box which connects its wires to the side of the box itself in such a way that the box can be made very shallow and installed over the vapor barrier.

Another object of the present invention is to provide a way for wires can also run over the vapor barrier and thus eliminate any puncture in the vapor barrier.

In order to do so, the shallow electric box has a back wall, and top, bottom, and opposite side walls perpendicularly connected to said back wall to thereby form a box shape. A wire connector connected to an interior surface of each of the side wall, and at least two tab members that are adapted to be mechanically connected to an electrical unit to be inserted within the electric box, and are adapted to frictionally engage respective the wire connectors on respective interior surfaces of each respective of the side wall, to thereby provide a quick and easy means for electrically inserting and removing the electrical unit from the electric box.

The shallow electric box has at least two tab members having connecting means on one end thereof adapted for removably attaching to a the electrical unit, and have a curved configuration on an opposite end configured such that the frictional engagement to each of the respective wire connector includes a bending and snapping movement, to thereby provide a means for a stronger removable connection between the electrical unit and the electric box.

Each of the respective wire connector includes two wire connector members separated by a link member such that each of the link member is adapted to conduct electricity between respective wire connector members, and wherein either of the link members can be cut to prevent electricity flowing between its respective wire connector members and thereby forming separate circuits.

The shallow electric box has four tab members, one respective tab member for each the wire connector member, and wherein each of the tab member is adapted to removably attach to a respective connector of the electrical unit.

The shallow electric box has the top and bottom walls each include a slit at opposite end portions adapted to match up with adjacent slit members of adjacent shallow electric boxes, and two hook connector members adapted to fit snugly within and between the top and bottom slits of an adjacent shallow electric box, to thereby provide means to connect a plurality of shallow box members in a side-by-side configuration.

The shallow electric box has each of the side wall include at least one winglet extending outward from an exterior surface therefrom, such that when installing the electric box into a sheet of drywall the winglet provides a means to properly position the electric box thereto.

The shallow electric box has deformable members on the top and bottom walls to thereby provide a means for inserting and retaining electrical wires therethrough.

The shallow electric box has a plurality of screw sockets in respective corners of the electric box, and adapted to allowing screw members to pass therethrough and connect the electric box to a wall stud.

In a preferred embodiment, a combination of a shallow electric box and an electrical unit, the electrical unit comprising at least one outlet connector on each side thereof; and the shallow electric box comprising a back wall, and top, bottom, and opposite side walls perpendicularly connected to the back wall to thereby form a box shape, a wire connector connected to an interior surface of each the side wall, and at least two tab members that are adapted to be mechanically connected to respective outlet connectors of the electrical unit to be inserted within the electric box, and are adapted to frictionally engage respective the wire connectors on respective interior surfaces of each respective of the side wall, to thereby provide a quick and easy means for electrically inserting and removing the electrical unit from the electric box.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 5a-b Front and side cutaway view of a box.

DETAILED DESCRIPTION OF THE PREFERRED EMBODIMENT

Figure 1:
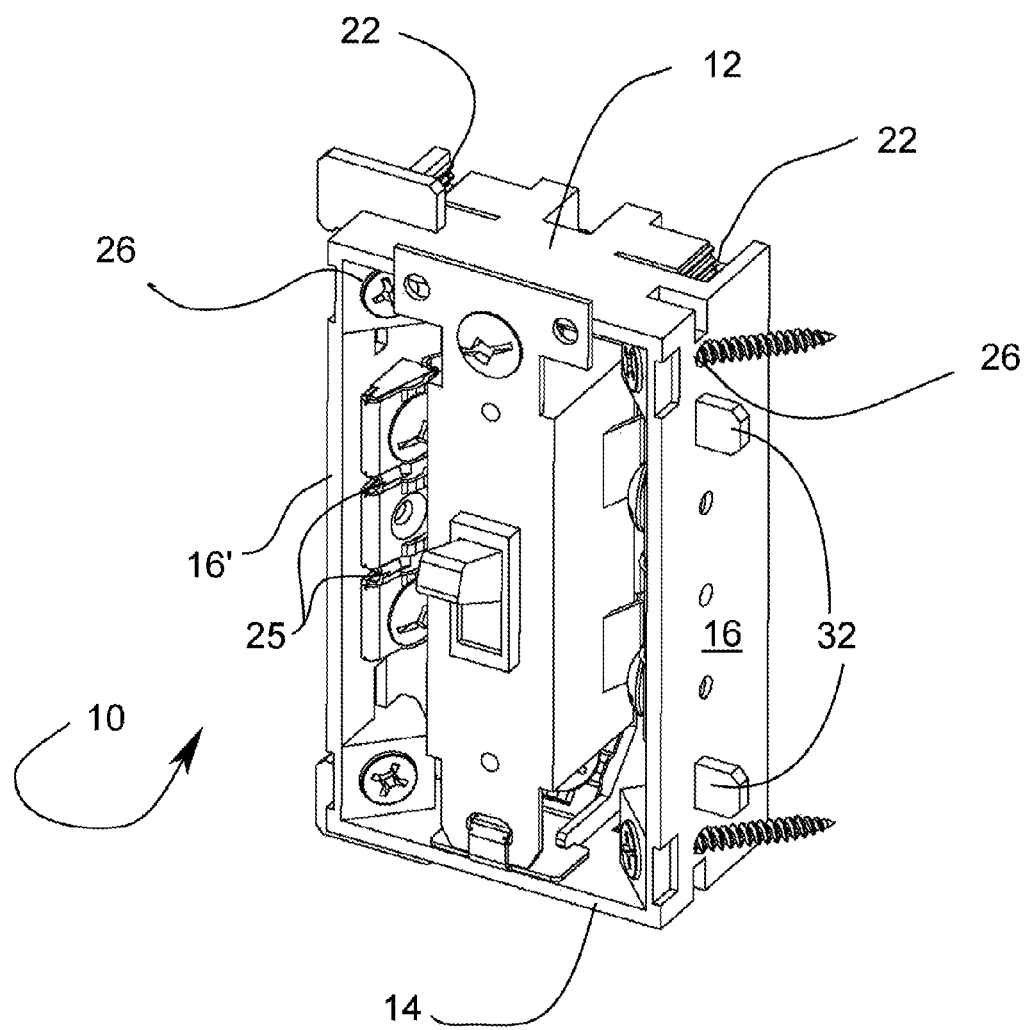
FIG. 1 Isometric view of the invention showing a switch installed.
Figure 2A:
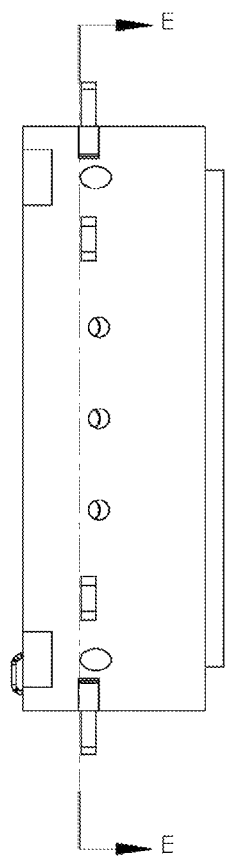
FIGS. 2a-b Side and front views of a double box.
Figure 2B:
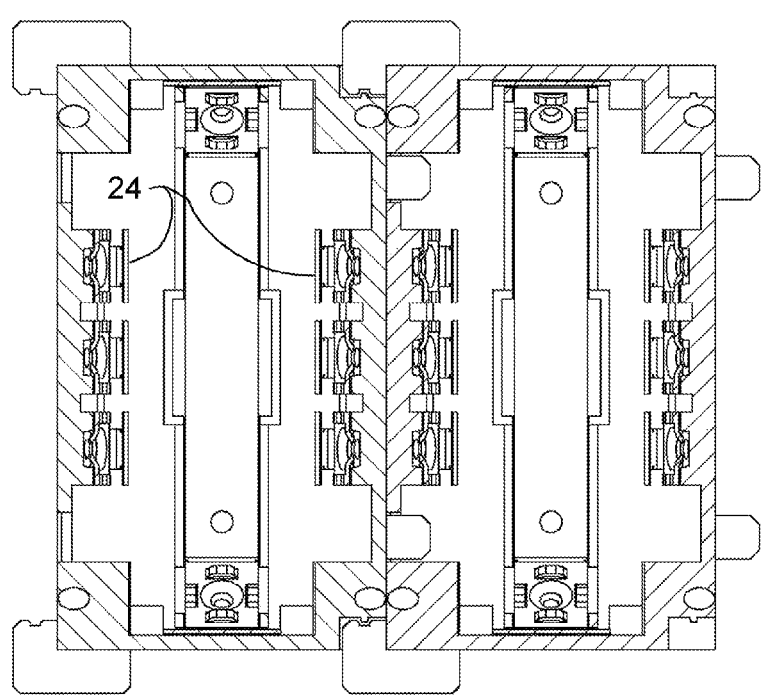
Figure 3A:
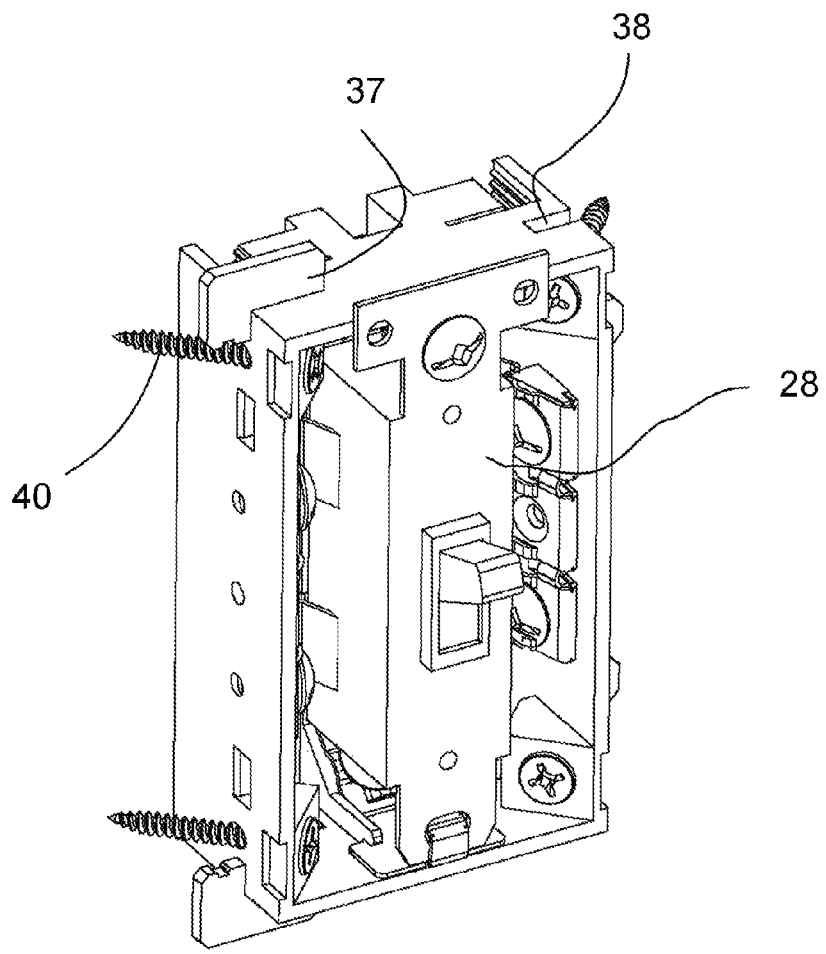
FIGS. 3a-b Reverse angle isometric view of FIG. 1 and top view of a switch with tabs.
Figure 3B:
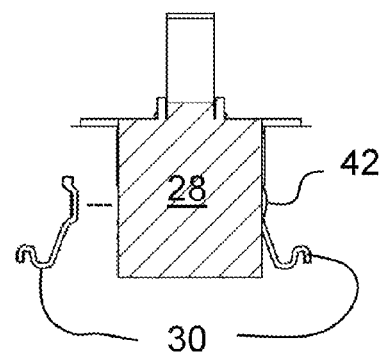

A shallow electric box (10) has four sides defined by a top wall (12), a bottom wall (14), and two side walls (16, 16'). Resiliently deformable members (22) create openings on the top and bottom walls (12, 14) that are used for inserting and retaining electrical wires (not shown).

Once inserted, the wires (not shown) are mechanically fastened to wire connectors (24) located on the interior side walls (16, 16'). These wire connectors (24) operate much the same way as similar connectors used in the art of electrical equipment in the sense that wires (not shown) are mechanically tightened thereto. As shown, the wire connectors (24) are linked together by a link (25) similar to that known in the art but which usually form part of a switch or an outlet, and which can be cut so as to separate into two circuits, for example. Screw sockets (26) located inside the box (10) allow for the easy mechanical fastening of the electric box (10) to a wall stud (not shown).

An electrical unit (28) which can be either a switch as shown or an outlet, is mechanically fastened to the electrical box (10) in a fashion that is very similar to the standard method known in the art but where it differs is that specially configured tab members (30) attached to the existing switch or outlet screws (42) found on standard switches and outlets. Those tab members (30) make a mechanical connection with the wire connectors (24). In this manner, an electrical connection is made between the electrical unit (28) and the wire connectors (24) Additionally, bottom and top ears (31, 31') are used in making a ground connection by bending the bottom ear (31) and pushing it into a stub (33) while a bottom ground contact member (35) is inserted through the bottom ear (31) and fastened with a lower ground screw (36). The top ear (31') is not bent but still mechanically connected to an upper ground screw (36') by way of an upper ground contact member (35').

Figure 4:
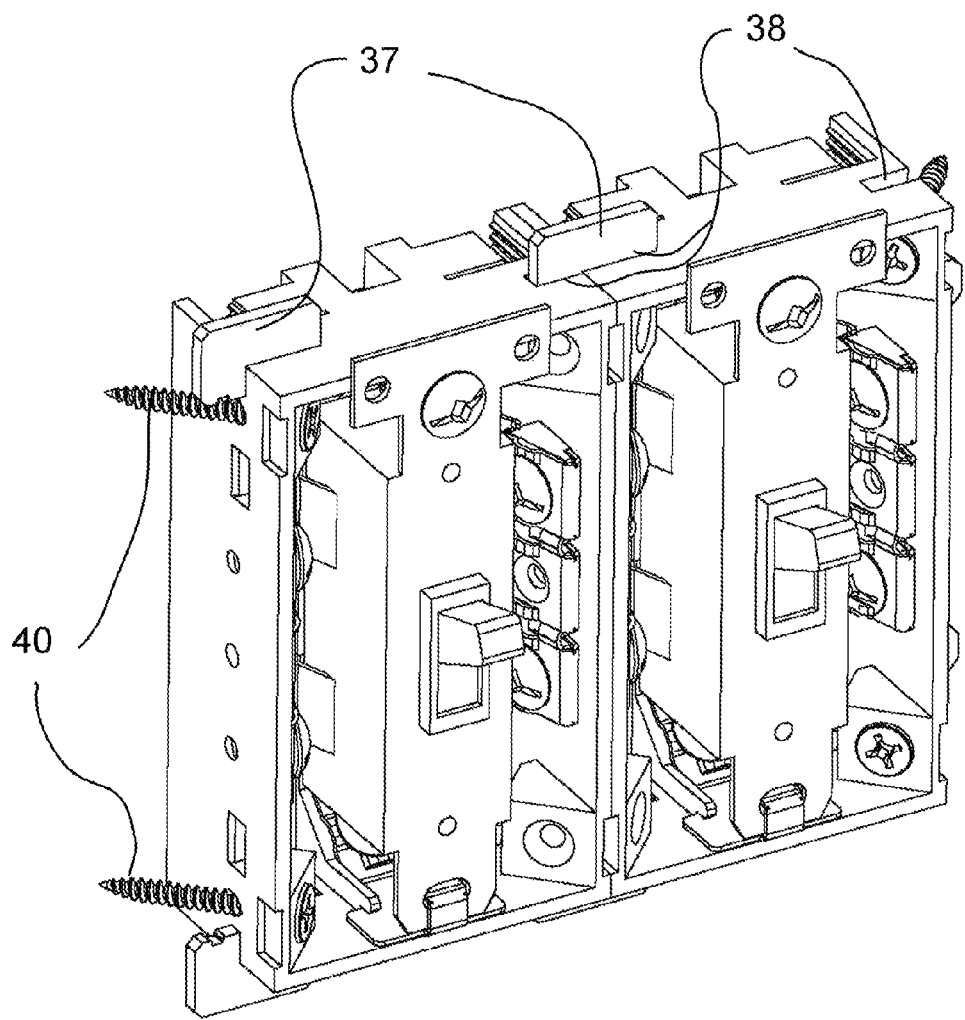
FIG. 4 Isometric view of a double box.
Figure 6A:
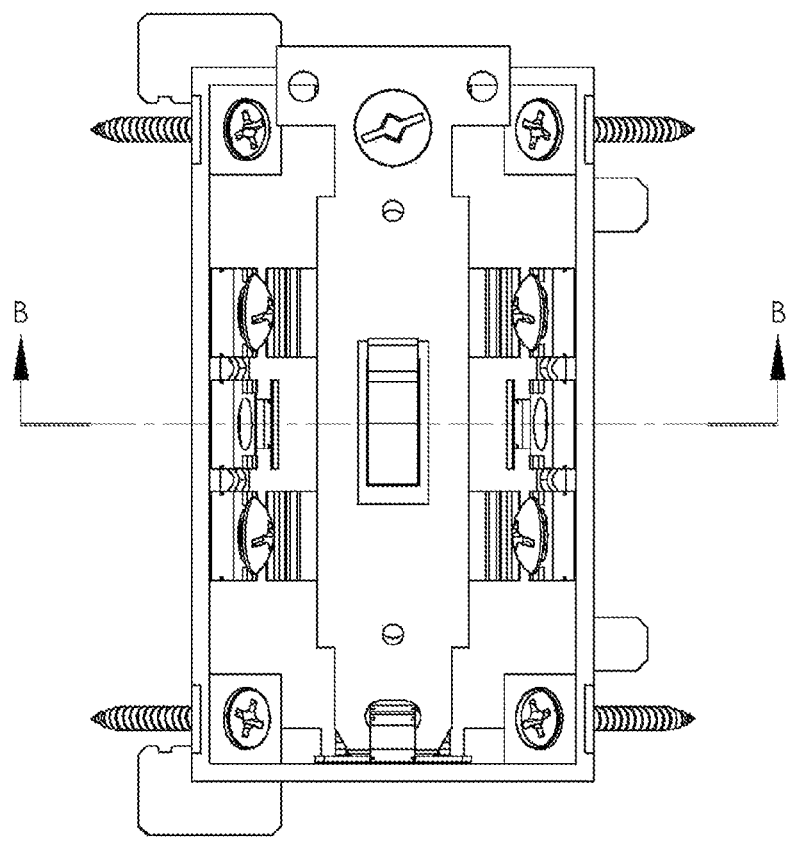
FIGS. 6a-b Front and top cutaway view of a box.
Figure 6B:
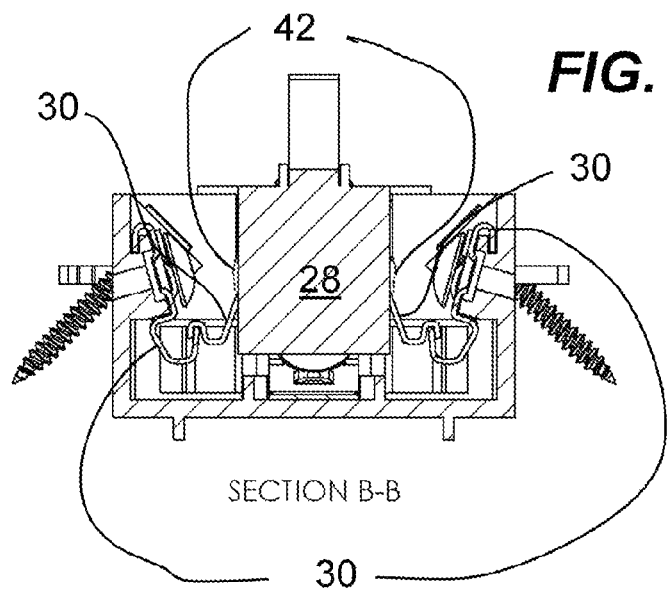

Other features include winglets (32) which are used to position the electric box (10) so that it lines up with a finished sheet of drywall (not shown). Hook connectors (37) are removable and insertable into a slit (38) so that two boxes (10) can be attached together as per FIG. 4. This is a new and novel way of connecting boxes (10) together. Mechanical fasteners (40) inserted through the screw sockets (26) secure the box to a stud (not shown).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, punch dies are the preferred tool used but other types of cutters such as rotary drill cutters could be used and still achieve a similar result.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A shallow electric box comprising: a back wall, and top, bottom, and opposite side walls perpendicularly connected to said back wall to form a box shape; a wire connector connected to an interior surface of each of said side walls; and at least two tab members that are mechanically connected to an electrical unit to be inserted within said electric box, and each of said tab members are frictionally engage each of said wire connectors in order to facilitate a quick and easy to insert and remove said electrical unit from said electric box, wherein each of said at least two tab members having a mounting hole on one end to removable attaching said tabs to said electrical unit; and each of said tabs having curved configuration on an opposite end configured such that said frictionally engage to said wire connectors, each of said of connectors includes a bending and snapping movement, to thereby provide a stronger removable connection between said electrical unit and said electric box.

2. The shallow electric box of claim 1, wherein each of said wire connectors further comprising additional two more wire connector members separated by a link member, such that each of said link members is adapted to conduct electricity between each of said wire connector members, and wherein one of said link members can be cut to prevent electricity flowing between one of said wire connector members and thereby forming separate circuits.

3. The shallow electric box of claim 2, wherein further comprising addition four tab members, and wherein each of said four tab members is adapted to removably attach to a one of said four connectors of said electrical unit.

4. The shallow electric box of claim 1, wherein said top and bottom walls include a slit at opposite end portions of said too and bottom walls adapted to match up with adjacent slit members of adjacent at least one shallow electric box and two hook connector members adapted to fit snugly within and between the top and bottom slits of the shallow electric box, to thereby provide to connect a plurality of shallow box members in a side-by-side configuration.

5. The shallow electric box of claim 1, wherein each said side walls includes at least one winglet extending outward from an exterior surface therefrom, such that when installing said electric box into a sheet of drywall, said winglet provides a properly position said electric box thereto.

6. The shallow electric box of claim 1, further comprising deformable members on said top and bottom walls, to thereby provide a inserting and retaining electrical wires therethrough.

7. The shallow electric box of claim 1, further comprising a plurality of screw sockets in respective corners of said electric box, and adapted to allowing screw members to pass therethrough and connect said electric box to a wall stud.

8. A combination of a shallow electric box and an electrical unit, said electrical unit comprising at least one outlet connector on each side thereof; and said shallow electric box comprising a back wall, and top, bottom, and opposite side walls perpendicularly connected to said back wall to form a box shape; a wire connector connected to an interior surface of each of said side walls; and at least one tab members that are mechanically connected to said outlet connectors of said electrical unit to be inserted within said electric box, and each of said tab members are frictionally engage each of said wire connectors in order to facilitate a quick and easy to insert and remove said electrical unit from said electric box, wherein each of said at least two tab members having a mounting hole on one end to removable attaching said tabs to said electrical unit; and each of said tabs having curved configuration on an opposite end configured such that said frictionally engage to said wire connectors, each of said connectors includes a bending and snapping movement, to thereby provide a stronger removable connection between said electrical unit and said electric box.

9. The combination of claim 8, wherein each of said wire connectors further comprising additional two more wire connector members separated by a link member; such that each of said link members is adapted to conduct electricity between each of said wire connector members, and wherein one of said link members can be cut to prevent electricity flowing between one of said wire connector members and thereby forming separate circuits.

10. The combination of claim 9, further comprising additional four tab members, and wherein said electrical unit comprises two outlet connectors on each side thereof each in alignment with a respective tab member of said electric box, and wherein each of said four tab members is adapted to removably attach to one of said four connectors of said electrical unit.

11. The combination of claim 8, wherein said top and bottom walls include a slit at opposite end portions of said top and bottom walls adapted to match up with adjacent slit members of adjacent shallow electric boxes; and two hook connector members adapted to fit snugly within and between the top and bottom slits of the shallow electric box, to thereby provide to connect a plurality of shallow box members in a side-by-side configuration.

12. The combination of claim 8, wherein each said side walls includes at least one winglet extending outward from an exterior surface therefrom, such that when installing said electric box into a sheet of drywall, said winglet provides a properly position said electric box thereto.

13. The combination of claim 8, further comprising deformable members on said top and bottom walls, to thereby provide a inserting and retaining electrical wires therethrough.

14. The combination of claim 8, further comprising a plurality of screw sockets in respective corners of said electric box, and adapted to allowing screw members to pass therethrough and connect said electric box to a wall stud.

15. The combination of claim 8, wherein said electrical unit further includes top and bottom ears; and wherein said electric box further includes a ground contact member and a ground screw on said top wall, and a stub member and ground screw on said bottom wall, wherein said top ear of said electrical unit is mechanically connected to said ground screw via said ground contact member, and wherein said bottom ear of said electrical unit is adapted to be bent and pushed into electrical contact with said stub member with said bottom ground screw connected therebetween.

* * * * *